3,119,666
Patented Jan. 28, 1964

3,119,666
METHOD FOR THE PREPARATION OF PHOSPHORUS PENTABROMIDE

Richard C. Nametz, St. Louis, Mich., assignor to Michigan Chemical Corporation, St. Louis, Mich., a corporation of Michigan
No Drawing. Filed Nov. 12, 1957, Ser. No. 695,548
12 Claims. (Cl. 23—205)

This invention relates to an improved method for the production of phosphorus pentabromide.

Phosphorus pentabromide (phosphoric bromide) is a known compound having a melting point above 100° C., at which temperature it decomposes to form phosphorus tribromide with the evolution of bromine. Due to its heat sensitivity, phosphorus pentabromide cannot be purified by distillation and is difficult to purify due to its highly reactive nature.

Phosphorus pentabromide has heretofore been prepared by direct addition of bromine to phosphorus tribromide. Phosphorus pentabromide is a solid at the temperatures used for its formation by this reaction, which must be below those at which it tends to decompose to revert to phosphorus tribromide with the release of bromine. In the course of this reaction, the reaction mixture solidifies to a solid mass which is difficult, if not impossible, to stir. This solid mass consists of the solid phosphorus pentabromide, and entrapped liquid phosphorus tribromide. When the remainder of the bromine necessary to convert the unreacted, entrapped phosphorus tribromide is added to this solid mass, it forms a more or less segregated liquid phase, which cannot react efficiently with the remainder of the phosphorus tribromide.

These phase relationships between the desired solid pentabromide product, the liquid bromine and the liquid phosphorus tribromide, together with the heat-sensitivity of the phosphorus pentabromide, have made its commercial production quite difficult and generally uneconomical.

It is the object of this invention to provide a method for the preparation of phosphorus pentabromide which is efficient and economical to operate, and which produces a product of high quality.

Other objects of this invention and its various advantageous features will become apparent from the description which follows.

By the method in accordance with this invention, I produce phosphorus pentabromide by reacting phosphorus tribromide with bromide in the presence of an inert solvent for both the phosphorus tribromide and the bromine, which is not a solvent for phosphorus pentabromide, while maintaining anhydrous reaction conditions and keeping the reaction mixture at a temperature within the range of about 30° C. to about 35° C.

In general, the inert volatile, halogenated aliphatic hydrocarbons are suitable solvents for use in this method. Carbon tetrachloride, ethylene dichloride, tetrachloroethylene, chloroform, methylene chloride and similar compounds are entirely suitable, and I prefer carbon tetrachloride since its volatility and other characteristics make it convenient to use in the reaction.

I specified, in the foregoing, that the inert solvent for bromine and phosphorus tribromide which I utilize is a non-solvent for phosphorus pentabromide, it will be fully understood that I use the term "non-solvent" in a relative sense. I prefer that the solubility of the phosphorus pentabromide in the solvent be quite low. However, a slight solubility of the phosphorus pentabromide in the solvent is immaterial, since in practical operation, I re-use the solvent for the reaction after the suspended phosphorus pentabromide is removed therefrom by filtration or by centrifuging after the reaction is completed. Therefore, upon the first use of the solvent it becomes saturated with the small amount of phosphorus pentabromide which it will dissolve, and will dissolve no more of the product upon reuse.

In this method, I utilize substantially equimolar quantities of bromide and of phosphorus tribromide, together with an amount of the co-solvent for bromine and phosphorus tribromide relative to the quantities of the reactants used which is within the range which will suspend the phosphorus pentabromide as a slurry which can be readily stirred and which at the end of the reaction can be readily filtered, but which does not provide an unwieldy bulk of material to handle.

I have found that it is conventient to use an amount of the co-solvent within the range of about 400 ml. to about 1000 ml. and preferably within the range of about 600 ml. to about 700 ml. for each gram mole of phosphorus pentabromide produced.

In carrying out this method, I may dissolve the phosphorus tribromide to be reacted in the entire quantity of the co-solvent to be used and add the bromine to this solution while maintaining anhydrous conditions. Again, I may dissolve the bromine in the co-solvent and add this solution to the phosphorus tribromide. However, I have found that it is desirable to dissolve the phosphorus tribromide in a portion of the inert co-solvent and the bromine in the remainder of the co-solvent to be used in the reaction and add the bromine solution to the phosphorus tribromide solution. In this manner, I am able to minimize the proportion of the co-solvent present at the beginning of the reaction, and progressively increase the proportion present as the reaction proceeds and greater proportions become necessary to keep the solid phosphorus pentabromide being produced in the form of a suspension in the reaction mixture and avoid the setting-up of the reaction mixture as a solid mass.

By this method, I find that I can obtain a substantially quantitative reaction with a yield approximating 97–98% of phosphorus pentabromide of high purity. As bromine is added to the solution of the phosphorus tribromide, the phosphorus pentabromide crystallizes from the solution giving a readily filterable suspension. After an equimolar quantity of bromine has been added to the solution of phosphorus tribromide, the phosphorus pentabromide is removed from the solution by filtration after being cooled to a temperature of about 20° C. The resulting coarse yellow crystals are then subjected to vacuum distillation to remove the residual solvent. The filtrate consisting of the co-solvent, any unreacted bromine or phosphorus tribromide which it may carry, together with any phosphorus pentabromide dissolved therein may be re-used without distillation or other purification in the production of another lot of the phosphorus pentabromide.

The method in accordance with this invention will be specifically illustrated by the following example.

Example

A solution of 271 grams (1.0 mole) of phosphorus tribromide in 500 ml. of carbon tetrachloride was prepared. A solution of 160 grams (1.0 mole) bromine in 150 ml. of carbon tetrachloride was added to this phosphorus tribromide solution while maintaining the mixture at a temperature of 20° C. to 30° C. and maintaining anhydrous reaction conditions by the use of phosphorus pentoxide drying tube. The phosphorus pentabromide started to separate from the reaction mixture in the form of yellow crystals, when approximately one-half of the bromine solution had been added. At the end of the addition of the carbon tetrachloride solution of bromine, the reaction mixture was cooled to a temperature of about 20° C. and was found to be readily filterable. The coarse yellow crystals separated from the solution by filtration were subjected to vacuum distillation under an absolute pressure of 5 millimeters to remove the residual carbon tetrachloride and give the final product.

In the foregoing I have specifically exemplified the method in accordance with this invention and set-forth various details as to the method. However, it will be understood by those skilled in the art, that numerous deviations may be made from the exact procedure set-forth without departing from the spirit of my invention or the scope of the claims which follow.

I claim:

1. A method for the production of phosphorus pentabromide which comprises reacting phosphorus tribromide and bromine under anhydrous conditions in the presence of an anhydrous chlorinated lower aliphatic hydrocarbon as a solvent for the bromine and the phosphorus tribromide in which phosphorus pentabromide is no more than slightly soluble to produce a suspension of phosphorus pentabromide in the said solvent, separating the phosphorus pentabromide from the said solvent, and removing the residual solvent from the phosphorus pentabromide.

2. A method for the production of phosphorus pentabromide which comprises reacting substantially equimolar proportions of phosphorus tribromide and bromine under anhydrous conditions in the presence of an amount of an anhydrous chlorinated lower aliphatic hydrocarbon as a solvent for the bromine and the phosphorus tribromide in which phosphorus pentabromide is substantially completely insoluble which will suspend the phosphorus pentabromide produced by the reaction as a slurry in the said solvent, separating the phosphorus pentabromide from the said solvent and removing the residual solvent from the phosphorus pentabromide.

3. A method for the production of phosphorus pentabromide which comprises reacting substantially equimolar proportions of phosphorus tribromide and bromine under anhydrous conditions at a temperature within the range of about 30° C. to about 35° C. in the presence of an amount of an anhydrous chlorinated lower aliphatic hydrocarbon as a solvent for the bromine and the phosphorus tribromide in which phosphorus pentabromide is substantially completely insoluble which will suspend the phosphorus pentabromide produced by the reaction as a slurry in the said solvent, filtering the phosphorus pentabromide produced by the reaction from the said solvent and removing the residual solvent from the phosphorus pentabromide filtrate by vacuum distillation.

4. A method for the production of phosphorus pentabromide which comprises dissolving phosphorus tribromide in an anhydrous chlorinated lower aliphatic hydrocarbon as solvent which is also a solvent for bromine, but which is a non-solvent for phosphorus pentabromide, slowly adding thereto about an equimolar proportion of bromine dissolved in the same solvent, while maintaining an anhydrous condition of reaction and utilizing a total amount of the said solvent which keeps the phosphorus pentabromide formed by the reaction in suspension throughout the course of the reaction and prevents the reaction mixture from setting-up as a massive solid, and upon the completion of the reaction separating the phosphorus pentabromide from the said solvent by filtration.

5. A method for the production of phosphorus pentabromide which comprises reacting phosphorus tribromide and bromine under anhydrous conditions while in solution in an anhydrous chlorinated aliphatic hydrocarbon to produce a suspension of phosphorus pentabromide in the said solvent, filtering the phosphorus pentabromide from the said suspension and removing the residual solvent from the phosphorus pentabromide filtrate by vacuum distillation.

6. A method for the production of phosphorus pentabromide which comprises dissolving phosphorus tribromide in an anhydrous chlorinated lower aliphatic hydrocarbon solvent, slowly adding thereto about an equimolar proportion of bromine dissolved in the same solvent while maintaining anhydrous conditions of reaction and utilizing a total amount of the said solvent which keeps the phosphorus pentabromide formed by the reaction in suspension throughout the course of the reaction and prevents the reaction mixture from setting-up as a massive solid, and upon the completion of the reaction separating the phosphorus pentabromide from the said solvent by filtration.

7. A method for the production of phosphorus pentabromide which comprises reacting phosphorus tribromide and bromine under anhydrous conditions while in solution in carbon tetrachloride to produce a suspension of phosphorus pentabromide in the carbon tetrachloride, filtering the phosphorus pentabromide from the said suspension and removing the residual carbon tetrachloride from the said phosphorus pentabromide by vacuum distillation.

8. A method for the production of phosphorus pentabromide which comprises dissolving phosphorus tribromide in anhydrous carbon tetrachloride, slowly adding thereto about an equimolar proportion of bromine dissolved in carbon tetrachloride while maintaining anhydrous conditions of reaction and utilizing a total amount of carbon tetrachloride which keeps the phosphorus pentabromide formed by the reaction in suspension throughout the course of the reaction and prevents the reaction mixture from setting up as a massive solid, upon completion of the reaction separating the phosphorus pentabromide from the reaction mixture by filtration and removing the residual carbon tetrachloride from the phosphorus pentabromide by vacuum distillation.

9. A method for the production of phosphorus pentabromide which comprises reacting phosphorus tribromide and bromine under anhydrous conditions while in solution in ethylene dichloride to produce a suspension of phosphorus pentabromide in ethylene dichloride, filtering the phosphorus pentabromide from said suspension and removing the residual ethylene dichloride from the said phosphorus pentabromide vacuum distillation.

10. A method for the production of phosphorus pentabromide which comprises reacting phosphorus tribromide and bromine under anhydrous conditions while in solution in tetrachloroethylene to produce a suspension of phosphorus pentabromide in the tetrachloroethylene, filtering the phosphorus pentabromide from said suspension and removing the residual tetrachloroethylene from the said phosphorus pentabromide vacuum distillation.

11. A method for the production of phosphorus pentabromide which comprises reacting phosphorus tribromide and bromine under anhydrous conditions while in solution in chloroform to produce a suspension of phosphorus pentabromide in the chloroform, filtering the phosphorus pentabromide from said suspension and removing the residual chloroform from the said phosphorus pentabromide vacuum distillation.

12. A method for the production of phosphorus pentabromide which compirses reacting phosphorus tribromide and bromine under anhydrous conditions while in solution in methylene chloride to produce a suspension of phosphorus pentabromide in the methylene chloride, filtering the phosphorus pentabromide from said suspension and removing the residual methylene chloride from the said phosphorus pentabromide vacuum distillation.

(References on following page)

References Cited in the file of this patent

J. W. Mellor's "A Comprehensive Treatise on Inorganic and Theoretical Chemistry," volume 2, 1922 edition, pages 86–88, and volume 8, 1928 edition, pages 1032–1035; Longmans, Green & Company, New York.

Seidell's "Solubilities of Inorganic and Organic Compounds," volume 1, second edition (1919), pages 160–161; D. Van Nostrand Company, Inc., New York.

"The Condensed Chemical Dictionary," Reinhold Publishing Company, New York (3rd edition, 1942), pages 135 and 505.

Yost et al.: "Systematic Inorganic Chemistry," 1944, page 242; Prentice-Hall, Inc., New York.

Lowry: "Inorganic Chemistry," 2nd edition, 1931, page 498, MacMillan and Company, London.